(12) United States Patent
Ciet et al.

(10) Patent No.: US 8,976,960 B2
(45) Date of Patent: Mar. 10, 2015

(54) METHODS AND APPARATUS FOR CORRELATION PROTECTED PROCESSING OF CRYPTOGRAPHIC OPERATIONS

(75) Inventors: Mathieu Ciet, Paris (FR); Benoit Chevallier-Mames, Paris (FR); Thomas Icart, Paris (FR); Bruno Kindarji, Paris (FR); Augustin J. Farrugia, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 13/437,687

(22) Filed: Apr. 2, 2012

(65) Prior Publication Data

US 2013/0259226 A1  Oct. 3, 2013

(51) Int. Cl.
*H04L 9/00* (2006.01)
*H04L 9/08* (2006.01)
*H04L 9/30* (2006.01)

(52) U.S. Cl.
CPC .... *H04L 9/08* (2013.01); *H04L 9/30* (2013.01)
USPC .......................................................... 380/44

(58) Field of Classification Search
CPC .................................. H04L 9/08; H04L 9/30
USPC .............................................. 380/44; 713/171
See application file for complete search history.

(56) References Cited

U.S. PATENT DOCUMENTS

| 7,134,025 | B1 | 11/2006 | Trimberger |
| 7,366,306 | B1 | 4/2008 | Trimberger |
| 7,397,916 | B2 | 7/2008 | Johnson et al. |
| 8,121,294 | B2 | 2/2012 | Ciet et al. |
| 8,130,554 | B1 | 3/2012 | Linnell |
| 2002/0042859 | A1 | 4/2002 | Lowry |
| 2006/0177061 | A1 | 8/2006 | Orsini et al. |
| 2007/0014400 | A1* | 1/2007 | Wack et al. ............... 380/44 |
| 2007/0160198 | A1 | 7/2007 | Orsini et al. |
| 2007/0294496 | A1 | 12/2007 | Goss et al. |
| 2008/0052541 | A1 | 2/2008 | Ginter et al. |
| 2008/0208560 | A1 | 8/2008 | Johnson et al. |
| 2009/0196417 | A1 | 8/2009 | Beaver et al. |
| 2009/0254759 | A1 | 10/2009 | Michiels et al. |
| 2010/0115286 | A1* | 5/2010 | Hawkes et al. ............ 713/189 |
| 2011/0138477 | A1 | 6/2011 | Jones et al. |
| 2011/0154060 | A1 | 6/2011 | Guyot et al. |
| 2011/0289271 | A1 | 11/2011 | Nagpal et al. |
| 2011/0311041 | A1 | 12/2011 | Murray |

OTHER PUBLICATIONS xor (exclusive-or), About.com, May 29, 2006, retrieved from http://web.archive.org/web/20060529031026/http://linux.about.com/cs/linux101/a/xor_exclusive-.htm (2 pages).
Create and Share (with a client app) a Random Encryption Key, John Simmons, Oct. 5, 2010, retrieved from http://www.codeproject.com/Articles/115435/Create-andShare-with-a-client-app-a-Random-Encryp (8 pages).

* cited by examiner

*Primary Examiner* — Anthony Brown
(74) *Attorney, Agent, or Firm* — Blakely, Sokoloff, Taylor & Zafman LLP

(57) ABSTRACT

A method and an apparatus that generate a plurality of elements randomly as a split representation of an input used to provide an output data cryptographically representing an input data are described. The input may correspond to a result of a combination operation on the elements. Cryptographic operations may be performed on the input data and the elements to generate a plurality of data elements without providing data correlated with the key. The combination operation may be performed on the data elements for the output data.

28 Claims, 6 Drawing Sheets

400

Providing inputs including a key and input data to cryptographically represent the input data as cryptographic output data based on a cryptographic algorithm, the cryptographic output data correlating the key and the input data 401

Generating a plurality of key elements as a split representation of the key, a sequence of cryptographic operations are operable over the input data and the key through a state cryptographically related to the input data and the key, each subset of the key elements being uncorrelated with the key, the key being recoverable via a combination operation on the key elements 403

Maintaining a plurality of state elements as a split representation of the state without providing the state, each subset of the state elements being uncorrelated with the key 405

Performing a sequence of mathematical operations on the key elements and the input data via the split representation of state, the sequence of mathematical operations corresponding to the cryptographic operations 407

Performing the combination operation on the state elements for the cryptographic output data 409

Returning the cryptographic output data 411

Providing inputs including a key and input data to cryptographically represent the input data as cryptographic output data based on a cryptographic algorithm, the cryptographic output data correlating the key and the input data 501

Randomly determining a split representation of the key, the split representation of the key including a plurality of key elements, the key not recoverable from any subset of the key elements, and the key recoverable via a combination operation on the split representation of the key 503

Performing a plurality of operations on input data and the split representation of the key, each operation providing a split representation of an output of the operation on one or more split representations corresponding to one or more inputs without providing any data correlated with the key, the operation corresponding to an arithmetic operation of the inputs for the output, and the plurality operations corresponding to cryptographic operations operable over the input data and the key 505

Performing the combination operation on a split representation of a result of the plurality of operations for the cryptographic output data 507

Returning the cryptographic output data 509

Fig. 5

METHODS AND APPARATUS FOR CORRELATION PROTECTED PROCESSING OF CRYPTOGRAPHIC OPERATIONS

FIELD OF INVENTION

The present invention relates generally to cryptographic processing. More particularly, this invention relates to protecting against data correlation based attacks for performing cryptographic operations.

BACKGROUND

Software implementation of cryptographic building blocks may be insecure in a white box threat model where an attacker can control the execution process of the corresponding cryptographic operations. The attacker can easily lift the secret key from memory by just observing the operations acting on the secret key. For example, the attacker can learn the secret key of an AES (Advanced Encryption Standard) software implementation by observing the execution of the Key Schedule algorithm.

Certain constructions of the AES algorithm attempt to keep an attacker who has control of the cryptographic execution process from finding the secret key used in the execution process. However, such constructions usually are based on embedding securities using table lookups and masked data. As a result, there is a need for knowing a secure key value at the compilation time, or at least to derive the tables from the original key in a secure environment.

However, many cryptographic based applications, such as DRM (digital right management) applications may be associated with secure keys which are not available at the compilation time. For example, dynamically generated session keys and/or personal security keys associated with different users may only be available at runtime. Furthermore, embedding or storing multiple keys to be used in an application may require excessive storage resources.

Therefore, traditional implementations of cryptographic operations may be susceptible to attacks from attackers who have control over execution of the cryptographic operations.

SUMMARY OF THE DESCRIPTION

A split data based implementation of cryptographic operations may propagate data throughout the operations in split representations of the data to prohibit possible correlation attacks. For example, a white box implementation of AES cipher based on split data representations may ensure that all variables appearing in the white box implementation cannot be correlated to variables used in classical AES implementations.

In one embodiment, an implementation based on K-Split (or K parts) representations for cryptographic operations can modify all the variables that are used in the implementation without modifying inputs to the cryptographic operations. Thus, separate executions of the implementations applied with the same message may lead to completely different traces (or memory traces) on intermediate values. K-Split representations may protect possible correlation attacks by spreading multiple splits or parts of data to different storage locations randomly to add a significantly difficult requirement for an adversary to localize all different parts of the data during runtime.

In another embodiment, split data based cryptographic operations may prohibit correlation attacks between a protected and an unprotected implementations of the operations. Variables in the protected implementations may not be correlated to variables in the unprotected implementations via split representations of data. Clues of execution of the protected code in cryptographic operations may be hidden to prevent reverse engineering to uncover secret data used in the operations.

In another embodiment, a plurality of key elements may be randomly generated as a split representation of a key used to provide cryptographic output data for input data. The cryptographic output data may correspond to a result of cryptographic (e.g. encrypting or decrypting) operations on the input data using the key. As a result, the cryptographic output data may be cryptographically related with the input data and/or the key. For example, correlation may be established to identify the key from the cryptographic output data and the input data. In other words, the cryptographic output data may be correlated with the input data. An output data is not cryptographically related with an input data if correlation cannot be established between the output data and the input data. The key may correspond to a result of a combination operation on the key elements. Cryptographic operations may be performed on the input data and the key elements to generate a plurality of data elements without providing data correlated with the key. The combination operation may be performed on the data elements for the cryptographic output data.

In another embodiment, a plurality of key elements may be generated as a split representation of a key. A sequence of cryptographic operations may be operable on input data and the key through a state to generate cryptographic output data of the input data. The state may correlate the input data and the key. Each subset of the key elements may not be correlated with the key corresponding to a result of a combination operation on all the key elements. A plurality of state elements may be maintained as a split representation of the state without providing traces of the state during execution. Each subset of the state elements may be uncorrelated with the key. A sequence of mathematical operations may be performed on the key elements and the input data via the split representation of state. The sequence of mathematical operations corresponds to the cryptographic operations. The combination operation may be performed on the state elements to provide the cryptographic output data.

In another embodiment, a split representation of a key may be determined in a random and unpredictable manner. The split representation of the key may include a plurality of key elements. The key may not be recoverable from any subset of the key elements. The key may be recoverable via a combination operation on the split representation of the key requiring availability of all the key elements. A plurality of operations may be performed on input data and the split representation of the key. Each operation may provide a split representation of an output of the operation on one or more split representations corresponding to one or more inputs without providing any data correlated with the key. The operation can correspond to an arithmetic operation of the inputs to generate the output. The plurality of operations correspond to cryptographic operations operable on the input data and the key to derive a cryptographic output data of the input data. The combination operation may be performed on a split representation of a result of the plurality of operations to obtain the cryptographic output data.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4 is a flow diagram illustrating one embodiment of a process to maintain split representations of states for cryptographic operations;

FIG. 5 is a flow diagram illustrating one embodiment of a process to determine a split representation of input data to perform split representation based operations for cryptographic processing;

DETAILED DESCRIPTION

Figure 1:
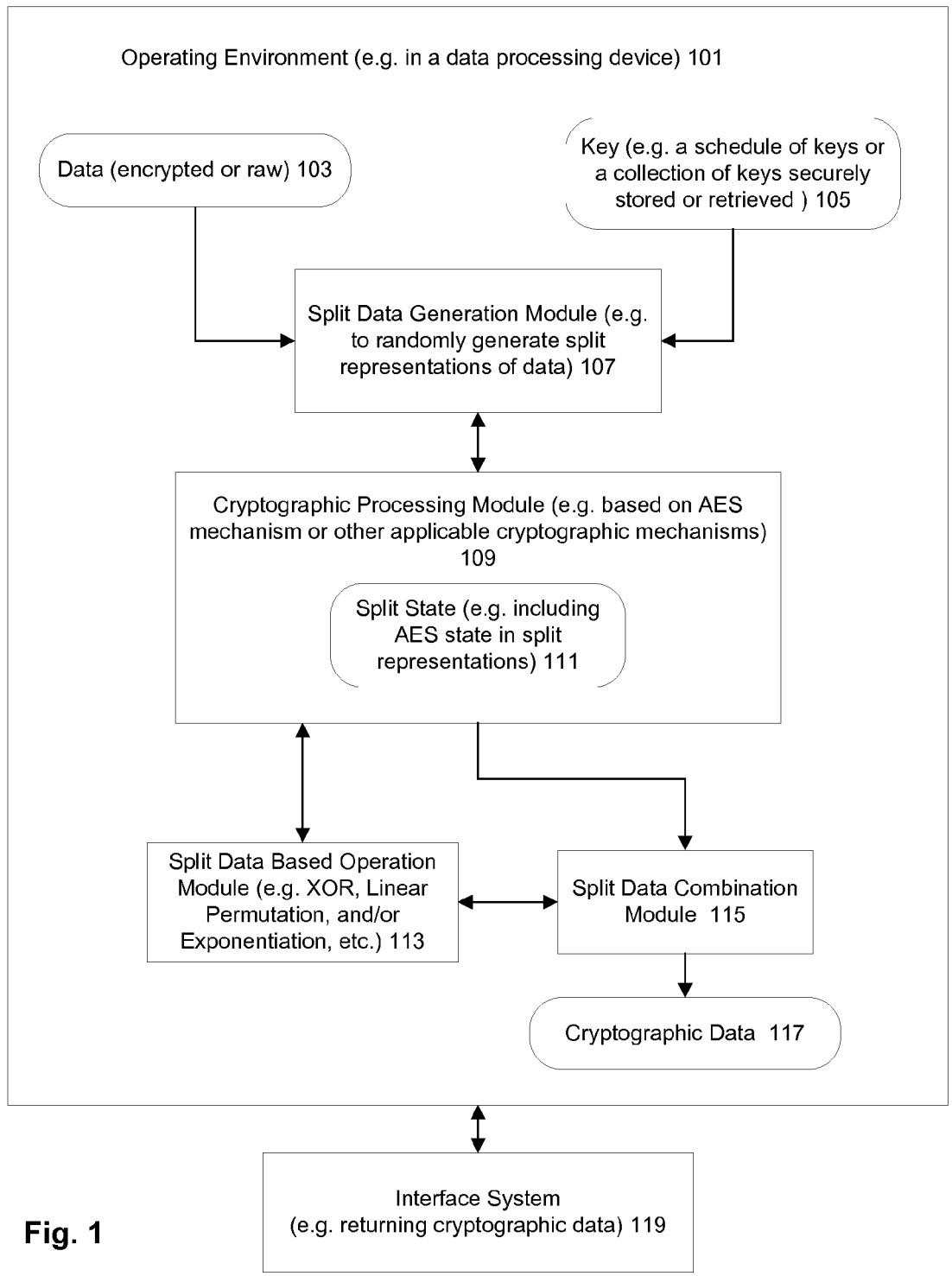
FIG. 1 is a block diagram illustrating one embodiment of a system for correlation protected cryptographic operations.

Methods and apparatuses for correlation attacks protected processing of cryptographic operations are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Introduction

In one embodiment, data may be represented in a split format to implement cryptographic operations to protect against correlation attacks. The split format for the data may be a K-Split representation with K data elements to represent the data. K may be an integer having a value greater than 1 representing a level (or a number of splits or shares) of a K-Split representation. In one embodiment, the cryptographic operations may be based on the AES standard, such as AES 128, AES 196, AES256, or other applicable versions or variations of AES operations. The level of split representations may not be constant during execution. The number of splits to represent the data may be increased or decreased at any time during execution of the cryptographic operations.

In one embodiment, an SBox(X) operation (e.g. substitution box operation or a substitution operation for symmetric key algorithms) may be implemented based on a K-Split representation of X. Classical XOR masks may be applied for implementing operations based on 2-Split representations. For implementing AES based operations, elements to be represented in K-Split formats may belong to a finite field GF(256) (Galois Field).

Extension of split representations of elements operated on may include inverse in GF(256) or other applicable finite field operations. Split representations may be used in the field of discrete logarithm over large $GF(2^n)$, where inversion are required to decrypt or even sign a signature when some Boolean masking would be needed. Split data based operations may be generated for implementing algorithms that require exponentiation operations over ring of integers.

Alternatively or additionally, K-Split representations of data may be extended to implementations of RSA (Ron Rivest, Adi Shamir and Leonard Adleman) cryptosystems as well as to side-channel secure implementation of the AES operations. Other mathematical structures used in cryptography where exponentiations are required and/or block ciphers using similar computation elements may be implemented based on split data representations with limited resource cost. It may suffice to replace XOR operations by add operation and to consider the integer multiplication instead of the GF(256) multiplication, for instance, to implement RSA based operations.

Exemplary Correlation Attack Protected Cryptographic Operations

In one embodiment, cryptographic operations, such as AES based cryptographic operations, may be performed with correlation attack protection for data encryption and/or decryption. For example, AES based cryptographic operations may include 10 rounds of operations employing a key with a size of 16 bytes or other applicable number of bytes. In one embodiment, an original key (e.g. 16 byte in size) for the AES operations is expanded to 11 sub-keys, during what is called the key-scheduling operation. Each sub-key is of the same size as the original key.

Each round of AES operations can contain an AddRoundKey operation, a SubByte operation, a ShiftRow operation and/or a MixColumn operation. Each operation can compute using a buffer as an AES state. The buffer can be of the same size (e.g. 16 byte) as a key employed in the AES operations. In total, AES based cryptographic operations may contain 9 rounds of AddRoundKey, SubByte, ShiftRow, MixColumn operations plus one round of AddRoundKey, SubByte, ShiftRow, and AddRoundKey operations.

Thus, AES operations with key size of 16 bytes can include 11 AddRoundKey operations, 10 SubByte operations, 10 ShiftRow operations and 9 MixColumn operations. Any intermediate results (e.g. temporarily stored in memory), including the AES state, provided during AES computations may be protected against potential correlation with the employed key.

Exemplary Correlation Protected Computations for Cryptographic Operations

In one embodiment, a cryptographic operation may be performed via one or more correlation protected (e.g. arithmetic or mathematical) operations based on partial representations of data (e.g. an input key to AES operations). Partial representations of the data may be combined to recover the data via a combination operation. Each subset of the partial representation of the data may be uncorrelated to the data. In other words, the data cannot be derived from any subset of the partial representations of the data.

Each correlation protected operation operable on input operand(s) for an output result may allow partial representations of each input operand and the output result. A partial representation of the output result may be obtained via one or more arithmetic or mathematical operations on the partial representations of the input operands without a need to perform any operation to recover any partially represented input operand.

For example, correlation protected operations may include an XOR operation, a linear permutation operation, an exponentiation operation and applicable arithmetic operations over a finite field of elements (or via finite field arithmetic). There may be a limited number of possible elements (e.g. numbers or values) in the finite field and all operations performed in the finite field may result in an element within that field. In one embodiment, these operations are performed within a finite field of elements.

AES operations may be made of a sequence of simple cryptographic operations. Each AES based cryptographic operation may correspond to (or be performed by) one or more of correlation protected operations. For example, an AddRoundKey operation can include an XOR operation. In some embodiments, an AddRoundKey operation is an XOR operation. A SubByte operation may include a linear permutation operation and an exponentiation operation. A MixColumn operation and a ShiftRow operation may comprise a linear permutation operation.

In one embodiment, an AddRoundKey operation is performed to obtain an XOR (exclusive-or) result between a key and a state of the AES operations.

In one embodiment, a ShiftRow operation is performed to reorder the state (e.g. as a 16 byte vector).

In one embodiment, a MixColumn operation is performed to apply a 32×32 linear matrix with coefficients in a set of two numbers {0,1} on 32 bits (or 4 bytes) of data at a time.

A SubByte operation (e.g. for a cipher) may be performed to cryptographically process a block of data non-linearly. For example, a SubByte operation may be applied to change one byte of data (or block of data) to another byte. Thus, a SubByte operation may cause one byte of data to influence another byte of data. On the contrary a MixColumn operation may be performed to propagate the influence of one byte of data to four (or multiple) bytes of data.

In one embodiment, a SubByte operation may be performed in a correlation protected manner as a combination of an exponentiation operation, a linear permutation operation and an XOR operation, for example, over a GF(256) (Galois Field of $2^8$) with 256 elements. The SubByte operation can correspond to an inverse in GF(256) for a non-null element (and 0 otherwise) with an additional affine transformation (or affine mapping between two affine spaces, defined by pairs of points or vectors as a linear transformation) over GF(256).

From a mathematical point of view, an inverse of an element x in GF(256) is defined as $1/x$ in GF(256) if x is not 0, and 0 if x is 0 (i.e. remains unchanged). The SubByte operation (e.g. in AES cipher as an extended AES inverse) can correspond to $X^{254}$ in GF(256). Indeed, the group of non-null elements in GF(256) is of order 255, so for an x not equal to 0, $x^- = x^{(255-1)} = x^{254}$, and $0^{254} = 0$.

The affine transformation is a linear operation (L) combined with a constant XOR operation. Here, linear means that for all couples (x,y) in GF(256), $L(x \oplus y) = L(x) \oplus L(y)$, where $\oplus$ denotes a XOR operation.

AES operations can be performed to decrypt or encrypt an input data depending on, for example, whether the AES operations are applied following an order or a reverse to the order. Thus, both encryption and decryption operations can be based on the same AES operations. In some embodiments, correlated protected operations may be applicable for AES operations based on extensions, alternatives, modifications or other flavors of AES standards, such as AES CBC MAC (cipher block chaining message authentication code) mode of operations.

K-Split Representation of Data

In one embodiment, data (e.g. an element of GF(256)) may be represented in K multiple parts as K-Split of the data. Each part may be a partial representation of the data. All parts in a K-Split of the data are needed to recover the data. Thus, any subset of partial representations in a K-Split of the data is uncorrelated with the data. Specifically, let X be a variable (e.g. an element of GF(256)), K-Split of X may correspond to a vector or any vector $(X_1, \ldots, X_k)$ satisfying the following property:

$X = X_1 \oplus \ldots \oplus X_k$

Thus, K-Split of value X may allow the value X to be stored in parts (or partial representations) that are all needed to recover X. If only (k−1) parts are available, X is completely unknown.

In one embodiment, a K-Split representation of X, $(X_1, \ldots, X_k)$, may include elements $X_1, \ldots, X_{k-1}$ as random variables, each $X_i$ uncorrelated with X. Thus, $X_k = X \oplus X_1 \oplus \ldots \oplus X_{k-1}$ is also a random variable. A random variable can be thought of as a quantity whose value is not fixed, but takes on different values, e.g. with a probability distribution describing the probabilities of different values occurring (e.g. at different times for the K-Splits of X).

There may be multiple possible K-Split representations of an element X. For example, given a K-Split representation $(X_1, \ldots, X_k)$ of an element X, there exist k! equivalent K-Splits of X with different orders among $X_1, \ldots, X_k$. The order of the $X_1, \ldots, X_k$ elements can be taken randomly.

In one embodiment, input variables (e.g. message blocks, keys and constants) for AES cryptographic operations may be represented in a K-Split format (or in K-Split representations). Further, during AES operations or execution, all the intermediate variables (or temporary data) are maintained in K-Split (e.g. with various levels) representations. As a result, all the variables that appear in protected code (for performing AES operations) may be random variables, uniformly distributed independently of the input variables. Thus, any data observable (e.g. from memory trace or dumping during AES processing) may not be correlated to any variable that can be derived from an AES cipher (algorithm) or a classical/smooth implementation of AES operations.

Maintaining K-Split Representations During Cryptographic Operations

In one embodiment, K-Split representations of all variables, data, and/or intermediary results may be maintained throughout correlation protected cryptographic operations. For example, keeping K-Split representations for correlation protected AES execution can avoid possible correlations between an unprotected (e.g. classical or smooth) AES implementation and the protected version of the AES implementations.

Correlation protected operations may be performed to maintain or propagate K-Split representations with both input operands and output result represented in a K-Split formats. For example, an XOR operation on X and Y in K-Split format $(X_1, \ldots, X_k)$ and $(Y_1, \ldots, Y_k)$ may provide a result $X \oplus Y = (X_1 \oplus Y_1, \ldots, X_k \oplus Y_k)$ in K-Split format. Different orders of splits (or elements) in a K-Split representation may correspond to the same data. The representation order may have no importance. For instance, $(X_1 \oplus Y_k, \ldots, X_k \oplus Y_1)$ may be also another K-Split representation of $X \oplus Y$.

Thus, for XOR operations, partial representations (or split elements) of K-Splits of input operands may be separately operated. A result of an XOR operation may correspond to applying XOR operations together on separately operated partial representations of input operands in any order. For example, XOR operations may be applied to 2 split elements of input operand Y and one split element of input operand X, as long as each split element of input operands is operated once.

A linear permutation operation L may be performed on an input operand X represented as a K-Split representation $(X_1, \ldots, X_k)$ in a correlation protected manner to provide a result $L(X)$ in a K-Split format. Since L is linear, $L(X)=L(X_1) \oplus \ldots \oplus L(X_k)$. Thus, $(L(X_1), \ldots, L(X_k))$ is a K-Split representation of $L(X)$. In other words, L can be applied to each element of a K-Split representation directly to provide a result of L in a K-Split format.

In one embodiment, an exponentiation operation of an input operand represented in a K-Split format may be performed via a square-and-multiply algorithm carrying out square and multiplication operations which keep intermediate results represented in K-Split formats. In characteristic 2 finite field (e.g. GF(2) or GF($2^8$), etc), a squaring operation can correspond to a linear operation. So, given an element X represented in a K-Split format $(X_1, \ldots, X_k)$, an easy way to compute K-Split of the square of X may be to get $(X_1^2, \ldots, X_k^2)$ via the linear operations.

Squaring in GF(256) can be implemented using a table look up operation on each K-Split element of the input operand without a need to combine the K-Split elements to protect against possible correlation. Other optimizations may be possible via known algorithms which are more efficient than the classical square and multiply algorithms to compute $X^{254}$ from X. For instance, the number of squaring operations may be configured as numerous as possible (e.g. to minimize the number of multiplication operations) for computing $X^{254}$ to take advantage of the efficiency of the squaring operation (e.g. compared with a multiplication operation).

In one embodiment, a multiplication operation may be performed on operands X and Y represented respectively in K-Split formats as $(X_1, \ldots, X_k)$ and $(Y_1, \ldots, Y_k)$ to provide a result of X*Y in a K'-Split format, K' may be K or another applicable number. A K-Split representation of X*Y (or the result of X*Y in K-Split format) may be constructed based on heuristic rules to maintain statistical independence among variables (e.g. operands, result) and/or split elements for K-Split representations of these variables.

For example, X*Y may be related to split elements of K-Split representations $(X_1, \ldots, X_k)$ and $(Y_1, \ldots, Y_k)$ for X and Y as shown in the following equation (according to distributivity or distributive property of multiplication through the addition: $a*(b \oplus c)=a*b \oplus a*c$):

$$X*Y=(X_1Y_1 \oplus \ldots \oplus X_1Y_k \oplus X_2Y_1 \oplus \ldots \oplus X_2Y_1 \oplus \ldots \oplus X_2Y_k \oplus \ldots \oplus X_kY_1 \oplus \ldots X_kY_k)$$

Thus, a $K^2$-Split representation of X*Y may be directly constructed based on the $K^2$ monomials $X_1Y_1, \ldots X_1Y_k, X_2Y_1, \ldots X_2Y_1, \ldots X_2Y_k, \ldots X_kY_1, \ldots X_kY_k$ as split elements of the $K^2$-Split representation.

A K-Split representation of X*Y may be constructed from the $K^2$-Split elements of the $K^2$-Split representation of X*Y or other representation of X*Y heuristically in a random and unpredictable manner. In one embodiment, the number of monomials or $K^2$-Split split elements may be determined (e.g. K) for each split element of the K-Split representation. Each split element of K-Split representations of X and Y may be constrained to appear once in each split element of the K-Split representation of X*Y. Thus, degrees of dependencies among split elements of the K-Split representation of X*Y (or a result of other applicable operation) and split elements of K-Split representations of X and Y (or operands) may be balanced (e.g. to prevent overweighting certain portions of operands).

For example, a K-Split representation of X*Y may be formed heuristically by grouping K elements by K elements of K of $K^2$-Split representation of X*Y as $(X_1Y_1 \oplus X_2Y_2 \oplus \ldots \oplus X_kY_k, X_2Y_1 \oplus X_3Y_2 \oplus X_1Y_k, \ldots X_kY_1 \oplus X_1Y_2 \oplus \ldots \oplus X_{k-1}Y_k)$. In some embodiments, a size of split representation, e.g. K for a K-Split representation, may be dynamically determined or changed during runtime with a scheduled or random variations to provide additional protection against correlation or other attacks. Alternatively or optionally, a maximum size of split representations may be applied to constrain computation resources required.

Variations of K-Split representations of X*Y may include permutations of one K-Split representation of X*Y. For example, the result of X*Y in K-Split format can be generalized via an index permutation $\sigma(.)$ applied over indices $\{1, \ldots, k\}$ as: $(X_1Y_{\sigma(1)} \oplus Y_2Y_{\sigma(2)} \oplus \ldots \oplus X_kY_{\sigma(k)}, X_2Y_{\sigma(1)} \oplus X_3Y_{\sigma(2)} \oplus \ldots \oplus X_1Y_{\sigma(k)}, \ldots, X_kY_{\sigma(1)} \oplus X_1Y_{\sigma(2)} \oplus \ldots \oplus X_{k-1}Y_{\sigma(k)})$. Alternatively, the K-Split representation of X*Y may be based on K-Split representations of operands X and Y as $(X_1, \ldots, X_k)$ and $Y_{\sigma(1)}, \ldots Y_{\sigma(k)})$.

A squaring operation may correspond to a special multiplication operation based on K-Split format. For example, a K-Split representation of $X^2$, a squaring operation performed on an operand X as $(X_1, \ldots, X_k)$ in a K-Split format, may correspond to a K-Split representation of a multiplication operation performed on operands $(X_1, \ldots, X_k)$ and $(Y_1, \ldots, Y_k)$. Operand $(Y_1, \ldots, Y_k)$ may represent $(X \oplus 0)$. Here, 0 may be represented in a K-Split format as a vector of 0 value elements. Then a K-Split representation of $X^2$ can be given by a K-Split representation of X*Y.

Properties of correlation protected operations based on K-Split data representations may be generic and are not specific to any set (e.g. group/field/ring) of elements over which operands or results are defined. For AES operations, elements operated on may be in the field of GF(256).

FIG. 1 is a block diagram illustrating one embodiment of a system for correlation protected cryptographic operations. In one embodiment, system 100 may include operating environment 101 hosted in a data processing device, such as a mobile phone device, a desktop computer, or a server, etc. Operating environment 101 may include data 103 to be cryptographically processed for security purposes. Data 103 may be a raw data to be encrypted or an encrypted data to be decrypted. For example, Data 103 may be part of streaming content with protected right or private data to be protected from unauthorized access.

In one embodiment, data 103 may be cryptographically processed based on key 105. Access to data 103 may be authorized with availability of key 105 which can be secretly retrieved locally, remotely (via a network) and/or temporarily over a specific period of time. For example, data 103 may be encrypted data to be decrypted as cryptographic output data 117 via cryptographic processing module 109 using key 105. Cryptographic process module 109 may include operations based on AES cipher or algorithm. Key 105 may include a schedule of keys (or a set of keys) expanded via AES cipher for providing cryptographic output data 117 from data 103.

In one embodiment, cryptographic processing module 109 may perform cryptographic operations based on split representations of data throughout execution of cryptographic operations. For example, intermediate results which can be observed (e.g. from memory dump) by attackers may be represented in split formats. The cryptographic operations may be associated with an AES state or a state of the AES cipher. Split State 111 may include a split representation (e.g. K-Split representation) of the AES state.

According to one embodiment, split data generation module 107 may randomly generate split representations of data for cryptographic processing module 109. For example, split data generation module 107 may perform data split operations to generate a K-Split representation of key 105 with a split size K for K separate split elements. Split data generation module 107 may determine the split size K for the data split operations. The split size K may be preconfigured or dynamically changed (e.g. randomly and unpredictably) during runtime. Each split element may be a random variable and key 105 may only be recovered by locating all K separate split elements, for example, from a memory. Portions or all of the K separate split elements may be present (e.g. in memory) at the same time with little or very low possibility of being located by a potential attacker to establish correlation relationship with key 105.

Optionally or alternatively, split data generation module 107 may convert or change a K'-Split representation of data with size K' into another K-Split representation of the same data with size K. K' may be smaller or larger than K. For example, split data generation module 107 can randomly identify K collections (or partitions, groups) from K' elements of a K'-Split representation of data for a K-Split representation of the same data. Each element of the K-Split representation of the data may correspond to one of the identified collections. In one embodiment, split data generation module 107 may perform a combination operation via, for example, split data combination module 115, on a collection of elements of K'-Split representation of a data for the corresponding element of the K-Split representation of the data.

Split data generation module 107 can support cryptographic processing module 109 to maintain K-Split representations of data during cryptographic processing. In one embodiment, split data generation module 107 may randomly provide different K-Split representations of the same data, either represented in a split format or as a regular single data item (e.g. stored in one location in a memory), at different times or as results of different operations of the split data generation module 107.

Split data based operation module 113 may carry out basic correlation protected operations using split data representations for cryptographic processing module 109. Each split data based operation (or basic correlation protected operation) may produce or generate a plurality of output data from a plurality of input data corresponding to split representations of one or more inputs. The plurality of output data may correspond to a split representation of an output of the split data based operation on the inputs. The split representations of the inputs and/or outputs may be of the same or different sizes. A portion of the plurality of input or output data may be present (e.g. in memory) at the same time.

Basic correlation protected operations may include XOR operation, linear permutation operation and/or exponentiation operation using split representations of data, for example, belonging to a field of finite elements. Cryptographic processing module 109 may generate a last result as a split representation of cryptographic output data 117. Split data combination module 115 may perform a combination operation, e.g. via XOR operations, from split data based operation module 113, to provide cryptographic output data 117. Interface system 119 may be coupled with system 101 to provide output data 117 as a result of an encryption or decryption of data 103 using key 105.

Figure 2:
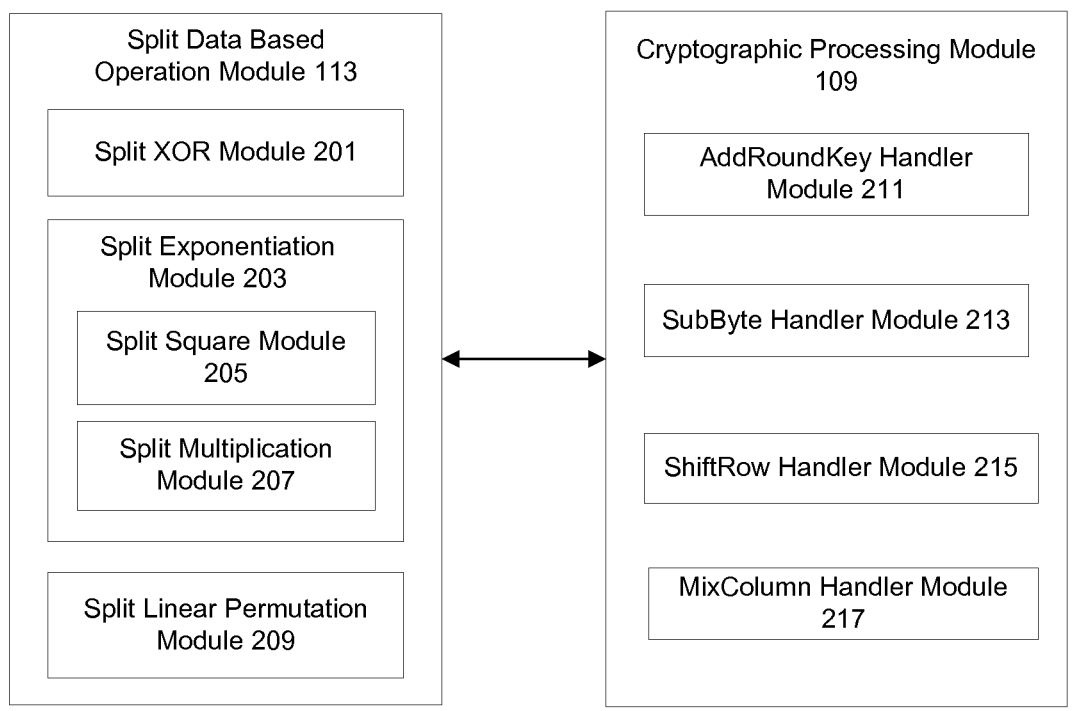
FIG. 2 is a block diagram illustrating one embodiment of a system for cryptographic processing via operations based on split data representations.

FIG. 2 is a block diagram illustrating one embodiment of a system for cryptographic processing via operations based on split data representations. For example, system 200 may include portions of system 1 of FIG. 1. In one embodiment, cryptographic processing module 109 may be capable of providing AES operations required in AES based cryptographic processing, including AddRoundKey operation, SubByte operation, ShiftRow operation, and MixColumn operation. These operations may be performed respectively via AddRoundKey handler module 211, SubByte handler module 213, ShiftRow handler module 215 and MixColumn handler module 217 in a correlation protected manner via operations based on K-Split representations of data in split data based operation module 113.

In one embodiment, an AES operation may be performed via one or more operations in split data based operation module 113 over a field of finite elements (e.g. GF(256)). For example, AddRoundKey handler module 211 may depend on XOR operations in Split XOR module 201 based on K-Split representations of data. MixColumn handler module 217 may depend on linear permutation operations in split linear permutation module 209 based on K-Split representations of data. SubByte handler module 213 may depend on exponentiation operations in split exponentiation module 203 based on K-Split representations of data. In one embodiment, an exponentiation operation based on K-Split representations of data in split exponentiation module 203 may be performed via square operations in split square module 205 and multiplication operations in split multiplication module 207 based on K-Split representations of data.

Figure 3:
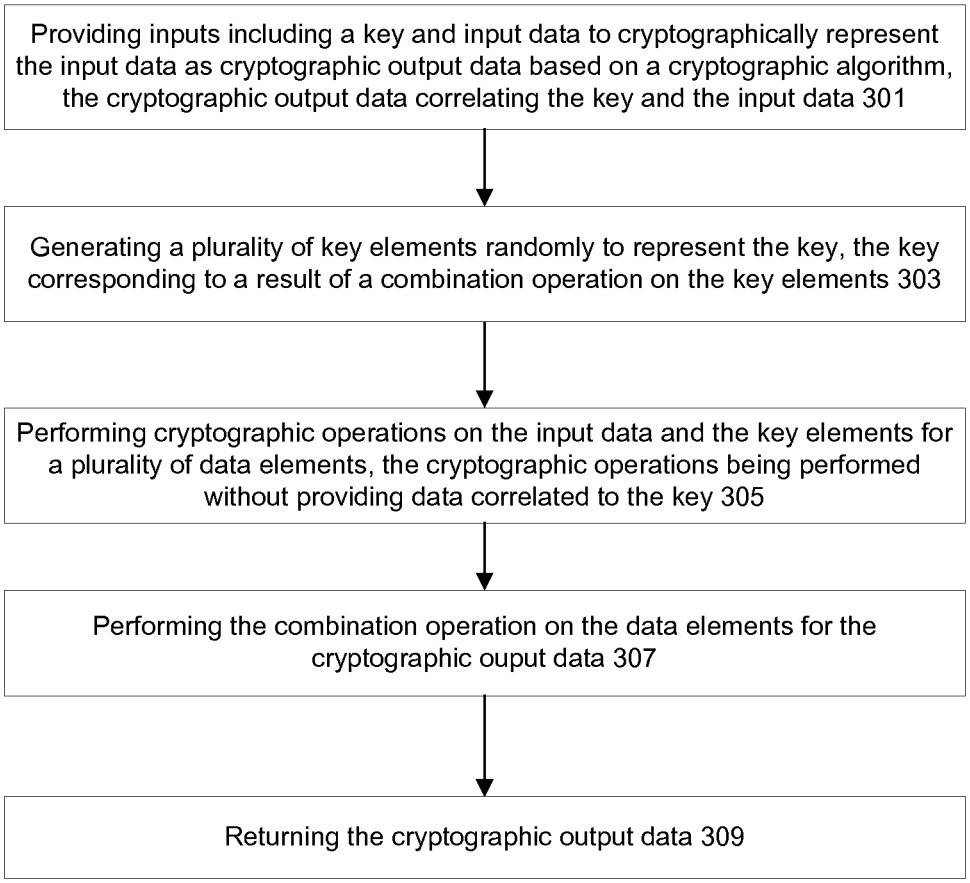
FIG. 3 is a flow diagram illustrating one embodiment of a process for correlation protected cryptographic operations based on split data.

FIG. 3 is a flow diagram illustrating one embodiment of a process for correlation protected cryptographic operations based on split data. Exemplary process 300 may be performed by a processing logic that may comprise hardware (circuitry, dedicated logic, etc.), software (such as is run on a dedicated machine), or a combination of both. For example, process 300 may be performed by some components of system 100 of FIG. 1. At block 301, the processing logic of process 300 can provide inputs including a key and input data for cryptographically representing the input data as cryptographic output data based on a cryptographic algorithm. For example, an encrypted data, a decrypted data or other cryptographically processed data from an input data (e.g. using a key) may cryptographically represent the input data. The encrypted data, decrypted data or other applicable cryptographic data obtained from the input data using AES standards may cryptographically represent the input data base on the cryptographic algorithms using the AES standards.

At block 303, the processing logic of process 300 can generate a plurality of key elements randomly to represent a key. The key can be an AES key or other applicable encryption/decryption key. Each key element may be a split in a, for example, K-Split representation of the key. The key may correspond to a result of a combination operation, such as an XOR operation, on the key elements. In one embodiment, K-Split representations are maintained to represent inputs (including key, input data and/or other applicable data) and all intermediate data to perform cryptographic operations.

Input data may be encrypted and/or decrypted using a key to derive or generate cryptographic output data. The key and the input data may be correlated with (or related to) the cryptographic output data. The correlation may indicate that the key can be determined if both the input data and the cryptographic output data are known. The key may not be correlated with the data if the key cannot be determined using the data and/or other available information (e.g. input data).

At block 305, the processing logic of process 300 may perform cryptographic operations on input data and key elements for a plurality of data elements. The key elements may represent a key in a split manner, e.g. as a K-Split representation. Optionally, the input data may be represented in the split manner. The cryptographic operations may be performed without providing data correlated to the key. The data elements may be temporarily stored in memory at different times or at the same time. Each individual data element and/or a subset of the data elements may not be correlated with the key.

In one embodiment, data elements may represent a final value for a state during AES based operations. At block 307, the processing logic of process 300 may perform a combination operation, such as an XOR operation, on the data elements to provide cryptographic output data for a key and input data. The data elements may correspond to a K-Split representation of the cryptographic output data. At block 309, the cryptographic output data may be returned via an input/output device.

FIG. 4 is a flow diagram illustrating one embodiment of a process to maintain split representations of states for cryptographic operations. Exemplary process 400 may be performed by a processing logic that may comprise hardware, software, or a combination of both. For example, process 400 may be performed by some components of system 100 of FIG. 1. At block 401, the processing logic of process 400 can provide inputs including a key and input data for cryptographically representing the input data as cryptographic output data based on a cryptographic algorithm.

At block 403, the processing logic of process 400 may generate multiple key elements as a split representation of a key. A sequence of cryptographic operations, such as AES based operations, may be operable on input data and the key through a state to produce cryptographic output data of the input data. The state as a whole, e.g. an AES state, may correlate the input data and the key. The state may be represented as a set of state elements as a K-Split representation throughout the cryptographic operations such that each state element may be stored (e.g. during runtime) at different memory locations. Each subset of state elements may be uncorrelated with key. Likewise, each subset of the key elements may not be correlated with the key. The key may correspond or can be recovered via a combination operation on all the key elements.

At block 405, the processing logic of process 400 can maintain multiple state elements as a split representation of the state without providing the state. In other words, the state can be represented by values located in different memory locations. Each subset of the state elements may be uncorrelated with the key. At block 407, the processing logic of process 400 can perform a sequence of mathematical operations, such as operations in split data based operation module 113 of FIG. 1, on the key elements and the input data via the split representation of a state. The sequence of mathematical operations may correspond to, for example, one implementation of cryptographic operations (e.g. based on the AES algorithm).

After completing cryptographic operations, at block 409, the processing logic of process 400 may perfume a combination operation on the state elements for cryptographic output data. Alternatively, the processing logic of process 400 can combine the state elements which are not correlated with a key to reveal the cryptographic output data which is correlated with the key. At block 411, the cryptographic output data may be returned via an input/output device.

FIG. 5 is a flow diagram illustrating one embodiment of a process to determine a split representation of input data to perform split representation based operations for cryptographic processing. Exemplary process 500 may be performed by a processing logic that may comprise hardware, software, or a combination of both. For example, process 500 may be performed by some components of system 100 of FIG. 1. At block 501, the processing logic of process 500 can provide inputs including a key and input data to cryptographically represent the input data as cryptographic output data based on a cryptographic algorithm. The cryptographic output data may correlated the key and the input data.

At block 503, the processing logic of process 500 may determine a split representation of a key in a random and/or unpredictable manner. The split representation of the key may include multiple key elements. For example, a K-Split representation of the key can include K key elements. The key may not be recoverable from any subset of the key elements. Thus, locations of each and every one of the key elements are required to be identified from a memory to recover the key. The key may correspond to a combination operation on the split representation of the key.

At block 505, the processing logic of process 500 can perform multiple operations on input data and a split representation of a key. Each operation can provide or generate a split representation of an output of the operation on one or more inputs represented as split representations without providing any data which can be correlated with the key.

Each operation which is based on split representations of inputs and an output can correspond to an arithmetic operation which produce the output from the inputs. These operations performed via the processing logic of process 500 may correspond to cryptographic operations operable on input data and a key for cryptographic output data cryptographically representing the input data via the key. At block 507, the processing logic of process 500 can perform a combination operation, such as an XOR operation, on a split representation of a result of these operations to provide the cryptographic output data. At block 509, the cryptographic output data may be returned via an input/output device.

Figure 6:
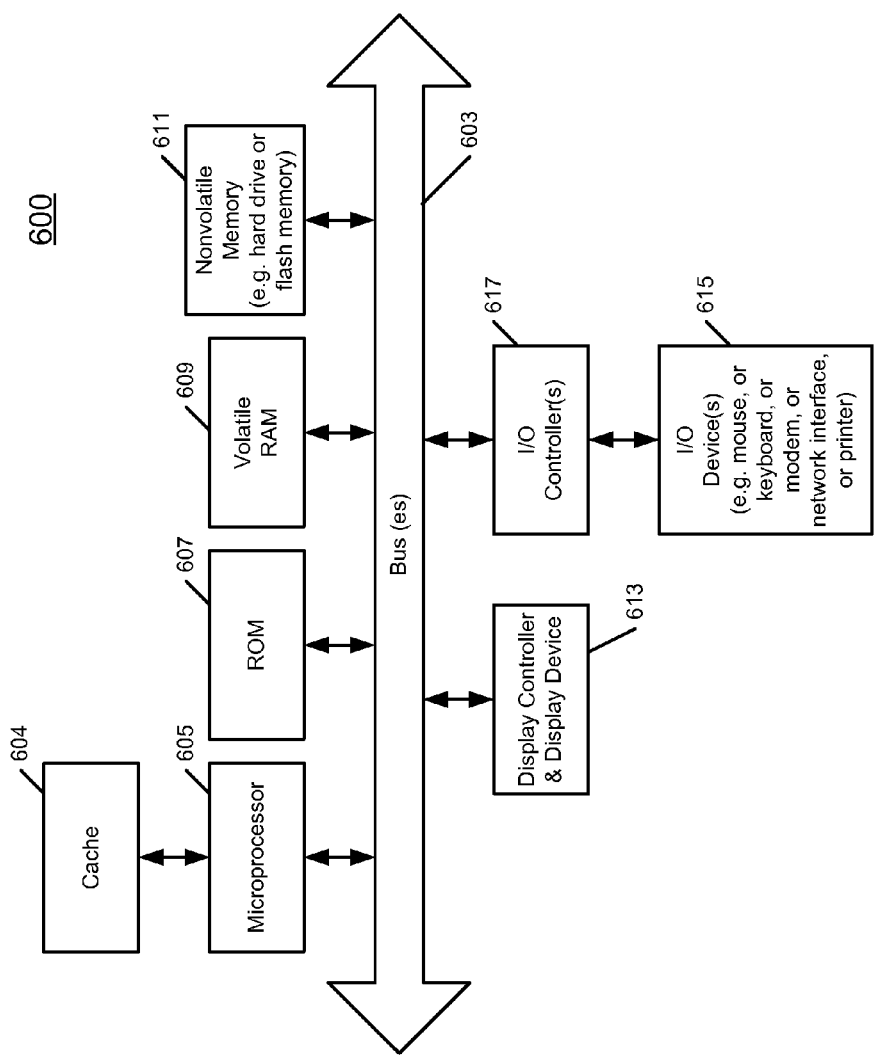
FIG. 6 illustrates one example of a data processing system such as a computer system, which may be used in conjunction with the embodiments described herein.

FIG. 6 shows one example of a data processing system, such as a computer system, which may be used with one embodiment the present invention. For example, system 1 of FIG. 1 may be implemented as a part of the system shown in FIG. 6. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 613 and to peripheral devices such as input/output (I/O) devices which may be mice, keyboards, modems, network interfaces, printers and other devices which are well known in the art. Typically, the input/output devices 615 are coupled to the system through input/output controllers 617. The volatile RAM (Random Access Memory) 609 is typically implemented as dynamic RAM (DRAM) which requires power continually in order to refresh or maintain the data in the memory.

The mass storage 611 is typically a magnetic hard drive or a magnetic optical drive or an optical drive or a DVD RAM or a flash memory or other types of memory systems which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein. The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, cause the machine to perform a method, the method comprising:

retrieving a key for use in generating cryptographic output data which represents input data;

generating a plurality of key elements randomly from the retrieved key, the key elements corresponding to a split representation of the key, each subset of the key elements uncorrelated with the key;

performing cryptographic operations on the input data and the key elements for a plurality of data elements, the cryptographic operations being performed via the key elements without providing data correlated with the key, wherein the key cannot be determined using the data provided during the cryptographic operations; and performing a combination operation on the data elements for the cryptographic output data.

2. The medium of claim 1, further comprising:
generating a plurality of input elements randomly as split representation of the input data, wherein the cryptographic operations are performed based on the input elements without providing data correlated with the input data.

3. The medium of claim 1, wherein the generation of the key elements comprises:
performing a data split operation on the key, wherein the data split operation is associated with a split size and wherein the number of the key elements to represent the key is based on the split size.

4. The medium of claim 3, wherein the split size of the data split operation is determined according to a configuration.

5. The medium of claim 3, wherein the performing the data split operation comprises:
identifying randomly one of a plurality of collections of possible key elements, wherein each collection of possible key elements is of the split size, wherein the key corresponds to a result of the combination operation on each collection of possible key elements and the key elements correspond to the identified collection of possible key elements.

6. The medium of claim 5, wherein at least one of the key elements is a random variable, wherein the random variable is of varying values to represent the key at different times, and wherein the random variable has a probability distribution.

7. The medium of claim 1, wherein the cryptographic operations include AES (Advanced Encryption Standard) based operations.

8. The medium of claim 1, wherein the data is encrypted with the key as the cryptographic output data.

9. The medium of claim 3, wherein each cryptographic operation is based on at least one of a plurality of split data based operations, each split data based operation to generate a plurality of output elements from a plurality of input elements, wherein the plurality of input elements correspond to split representations of one or more inputs for the split data based operation and wherein the plurality of output elements correspond to a split representation of a result of the split data based operation on the inputs.

10. The medium of claim 9, wherein the split data based operations are finite field operations over a finite field containing a finite number of possible data.

11. The medium of claim 10, wherein the finite field operations include one or more exponentiation operations.

12. The medium of claim 11, wherein the exponentiation operations generate a plurality of particular output elements from a plurality of particular input elements, the particular output elements correspond to a split representation of a particular output value, the particular input elements correspond to a split representation of a particular input value, wherein the particular input value and the particular output value belong to a finite field and wherein the particular output value is an inverse of the particular input value in the finite field.

13. The medium of claim 9, wherein a particular one of the split data based operations generates an output split representation of a particular result from input split representations of one or more particular inputs, each input split representation to represent one of the particular inputs.

14. The medium of claim 10, wherein the particular result corresponds to a multiplication of the particular inputs.

15. The medium of claim 13, wherein number of elements in the output split representation is of same value as number of elements in each input split representation.

16. The medium of claim 13, wherein number of elements in the output split representation is of a greater value than number of elements in one of the input split representation and wherein performing the cryptographic operations comprises:
performing the data split operation on the output split representation of the particular result for a separate output split representation of the particular result, wherein the split size of the data split operation specifies the number of elements of the separate output split representation, and wherein the split size is smaller than the number of elements in the output split representation.

17. The medium of claim 16, wherein the split size is determined dynamically in an unpredictable random manner.

18. The medium of claim 16, wherein the split size is determined according to number of elements in one of the input split representation representations.

19. The medium of claim 16, wherein performing the data split operation on the output split representation comprises:
selecting elements from the output split representation for each element of the separate output split representation, wherein the selected elements depend on each particular input to maintain statistical independencies among the elements of the separate output split representation of the particular result.

20. A machine-readable non-transitory storage medium having instructions therein, which when executed by a machine, cause the machine to perform a method, the method comprising:
retrieving a key for cryptographic output data representing input data cryptographically based on the key, wherein a sequence of cryptographic operations are operable on the input data and the key through a state for cryptographic output data of the input data, the state correlating the input data and the key;
generating a plurality of key elements from the key retrieved, the key elements corresponding to a split representation of the key, each subset of the key elements being uncorrelated with the key;
maintaining a plurality of state elements as a split representation of the state without providing the state correlated with the key, each subset of the state elements being uncorrelated with the key;
performing a sequence of mathematical operations on the key elements and the input data via the split representation of state, the sequence of mathematical operations corresponding to the cryptographic operations; and
performing a combination operation on the state elements for the cryptographic output data.

21. The medium of claim 20, wherein the state is recoverable via the combination operation on the state elements in the split representation of the state.

22. The medium of claim 20, wherein a plurality of separate state elements correspond to a separate split representation of the state, wherein the split representation of the state includes a number of the state elements, wherein the separate split representation includes a separate number of the separate state elements, and wherein the maintenance of the state elements comprises:
partitioning the state elements into a plurality of partitions, each partition corresponding to one of the separate state elements; and
performing the combination operation on the partition for the corresponding one of the separate state element.

23. The medium of claim 22, wherein the combination operation is an XOR operation over a field of a finite number of elements.

24. The medium of claim 20, wherein the cryptographic operations are based on AES (Advanced Encryption Standards) standards using the state.

25. The medium of claim 20, wherein the cryptographic operations are based on AES (Advanced Encryption Standards) CBC MAC (cipher block chaining message authentication code) mode of operations.

26. A machine-readable non-transitory storage medium having instructions therein, which when executed by a machine, cause the machine to perform a method, the method comprising:
   retrieving a key for cryptographic output data representing input data based on the key, wherein cryptographic operations are operable over the input data and the key for the cryptographic output data;
   randomly determining a split representation of the key, the split representation of the key including a plurality of key elements generated from the key retrieved, wherein the key is not recoverable from any subset of the key elements;
   performing a plurality of operations on the input data and the split representation of the key, wherein each operation provides a split representation of an output of the operation on one or more split representations corresponding to one or more inputs without providing any data correlated with the key, wherein the operation corresponds to an arithmetic operation of the inputs for the output, and wherein the plurality operations correspond to the cryptographic operations;
   performing a combination operation on a split representation of a result of the plurality of operations for the cryptographic output data.

27. A cryptographic device having logic configured to perform a method comprising:
   receiving an input for an output data representing input data cryptographically based on the input;
   generating a plurality of input elements randomly from the input received, the input elements corresponding to split representation of the input received, each subset of the input elements uncorrelated with the input;
   performing cryptographic operations on the input elements for a plurality of data elements, the cryptographic operations being performed without providing data correlated with the input; and
   performing the combination operation on the data elements for the output data cryptographically representing the input data.

28. A computer system comprising:
   a memory storing executable instructions and a key;
   an interface to receive an input data;
   a processor coupled to the memory and the interface to execute the instructions from the memory, the processor being configured to
      generate a plurality of key elements randomly from the key stored in the memory, the key elements corresponding to a split representation of the key for output data representing the input data cryptographically based on the key,
      perform cryptographic operations on the input data and the key elements for a plurality of data elements, the cryptographic operations being performed via the key elements without providing data correlated with the key, and
      perform the combination operation on the data elements for the output data.

* * * * *